US012415194B2

(12) United States Patent
Peng et al.

(10) Patent No.: US 12,415,194 B2
(45) Date of Patent: Sep. 16, 2025

(54) CONNECTING STRUCTURE FOR LIQUID CONTAINER

(71) Applicant: National Taipei University of Technology, Taipei (TW)

(72) Inventors: Chi-Chuan Peng, Taipei (TW); Chen-Ching Ting, Taipei (TW); Tzu-Chiao Lin, Taipei (TW); Ho Chang, New Taipei (TW)

(73) Assignee: National Taipei University of Technology, Taipei (TW)

( * ) Notice: Subject to any disclaimer, the term of this patent is extended or adjusted under 35 U.S.C. 154(b) by 532 days.

(21) Appl. No.: 17/947,092

(22) Filed: Sep. 17, 2022

(65) Prior Publication Data

US 2024/0091799 A1 Mar. 21, 2024

(51) Int. Cl.
*B05B 7/24* (2006.01)
*B05B 9/08* (2006.01)
*B65D 21/02* (2006.01)

(52) U.S. Cl.
CPC ............ *B05B 7/2408* (2013.01); *B05B 9/085* (2013.01); *B65D 21/0202* (2013.01)

(58) Field of Classification Search
CPC ............ B65D 21/0202; B65D 21/0201; B65D 21/02; B05B 7/2408; B05B 9/085
USPC .. 220/23.89, 23.88, 23.87, 23.83, 23.4, 23.2
See application file for complete search history.

(56) References Cited

U.S. PATENT DOCUMENTS

2013/0284735 A1* 10/2013 Oesterle ............. B65D 21/0201
220/23.4

* cited by examiner

*Primary Examiner* — Robert J Hicks
(74) *Attorney, Agent, or Firm* — Apex Juris, pllc; Hilde M. L. Coeckx

(57) ABSTRACT

A connecting structure for a liquid container includes a receiving groove. The liquid container having a suction tube is disposed in the receiving groove. A top end of the receiving groove is engaged with a connecting base. A front side of the connecting base is pivotally connected to a locking assembly protruding frontwards. A liftable base being movable along a top-bottom direction and a front-rear direction is disposed in an inner side of the connecting base, and has a bottom frame engaging with a sleeve that is for being connected to and communicating with a liquid pipeline and fits around the suction tube. Two extending arms extending frontwards out of the bottom frame are pivotally connected to the locking assembly. A left side and a right side of the bottom frame are pivotally connected to two swinging arms that extend backwards and are pivotally connected to the connecting base.

10 Claims, 10 Drawing Sheets

CONNECTING STRUCTURE FOR LIQUID CONTAINER

BACKGROUND OF THE INVENTION

Technical Field

The present invention relates generally to a structure for installing a liquid container, and more particularly to a connecting structure for a liquid container.

Description of Related Art

When adding a liquid to the conventional liquid dispensers, a bottle containing the liquid is turned upside down to insert into the liquid dispensers, making the liquid flow into the liquid dispensers via a way of gravity. Alternatively, a bottle is engaged with a cap to make the bottle communicate with a suction tube of the cap, and the liquid in the bottle is pumped into the liquid dispensers via a pump for dispensing.

The conventional liquid dispensers have drawbacks. With the way of gravity to make the liquid flow into the liquid dispensers, when the bottle is turned upside down to provide the liquid, the liquid dispensers have to be stable and cannot shake to prevent the bottle that is turned upside down from disengaging from the liquid dispensers to cause leakage. Such a structure is not suitable for applying to a field that the bottle has to move with the liquid dispensers. Moreover, with the structure of the liquid dispensers of which the bottle is engaged with the cap, engaging the bottle with the cap is troubling and time-consuming. Therefore, a structure allowing the liquid dispenser to engage with the bottle rapidly is needed, so as to facilitate the liquid in the bottle to flow into the liquid dispenser.

BRIEF SUMMARY OF THE INVENTION

In view of the above, the primary objective of the present invention is to provide a connecting structure for a liquid container, which could allow a sleeve of a liquid pipeline to be rapidly connected to a liquid container, and a liquid in the liquid container would not leak even if the liquid container is tilted when the liquid container is engaged with the sleeve.

The present invention provides a liquid container connecting structure including a receiving groove, a liquid container, and a locking structure. The liquid container is disposed in the receiving groove, wherein a top end of the liquid container has a suction tube. The locking structure includes a connecting base, a locking assembly, two swinging arms, and a sleeve, wherein the connecting base is engaged with a top side of the receiving groove. A left side and a right side of the connecting base respectively have a side plate, and a left side and a right side of the locking assembly respectively have a side arm, wherein a rear end of each of the two side arms is pivotally connected to a front side of one of the two side plates. The two side arms extend along a front-rear direction and extend frontwards out of the connecting base, wherein two front ends of the two side arms are connected to a pressing plate. The liftable base is disposed between the two side plates and has a bottom frame. The liftable base moves along a top-bottom direction in the connecting base and moves along the front-rear direction in the connecting base. Two extending arms respectively extend frontwards along the front-rear direction out of a left side and a right side of the bottom frame. A front end of each of the two extending arms is pivotally connected to a front side of each of the two side arms. The left side and the right side of the bottom frame are respectively and pivotally connected to the front end of each of the two swinging arms. A rear end of each of the two swinging arms is pivotally connected to a rear side of one of the two side plates. The sleeve is engaged with the bottom frame and fits around the suction tube.

With the aforementioned design, the sleeve could fit around the suction tube of the liquid container by pressing the locking assembly to drive the liftable base and the sleeve to decline. At that time, even if the liquid container connecting structure is tilted to make the liquid container tilt, the liquid in the liquid container would not leak outwards. Moreover, when the liquid container is needed to be replaced, the liquid container could be released for users to withdraw and replace by flipping the locking assembly upwards to drive the liftable base and the sleeve to lift, thereby the sleeve for connecting to the liquid pipeline could be rapidly connected to or disconnected to the liquid container.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
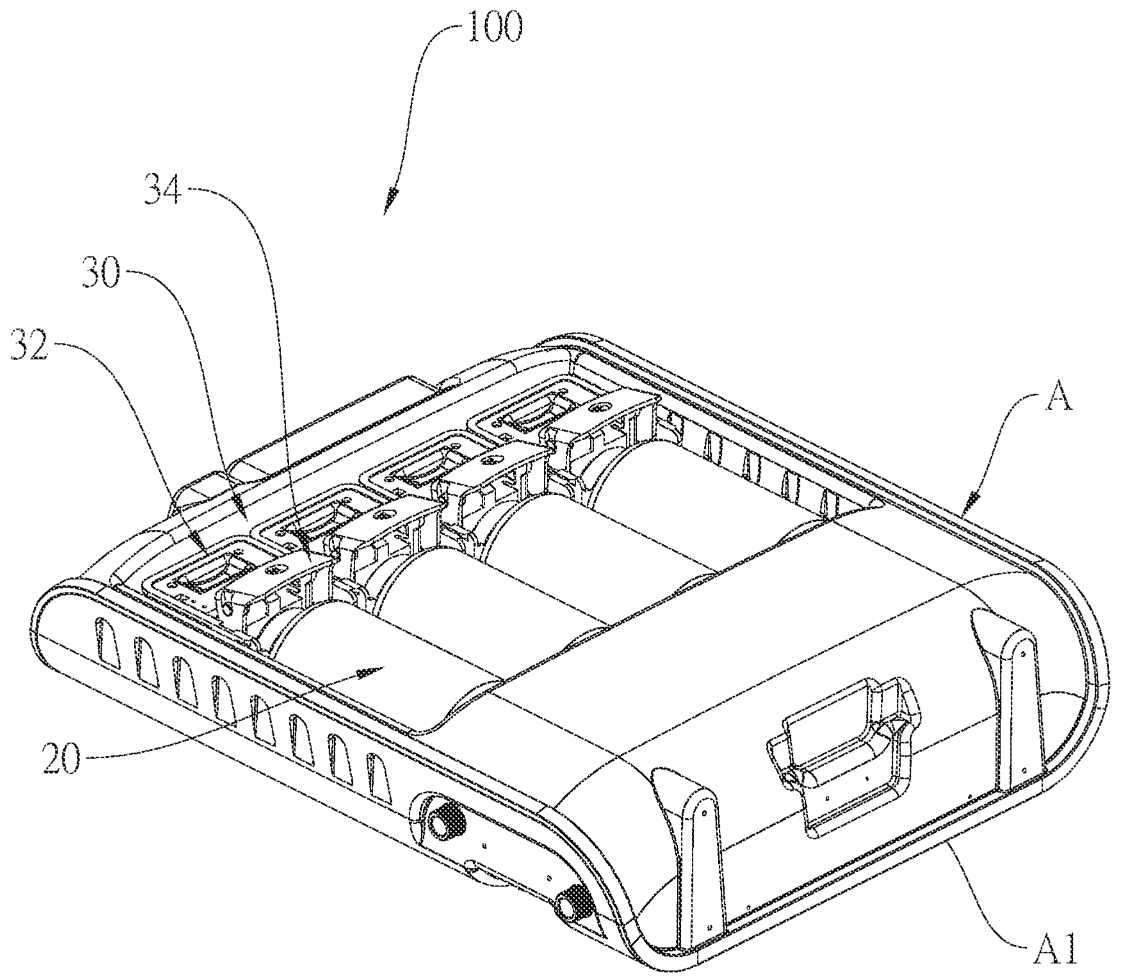
FIG. 1 is a perspective view of the liquid container connecting structure according to an embodiment of the present invention.
Figure 2:
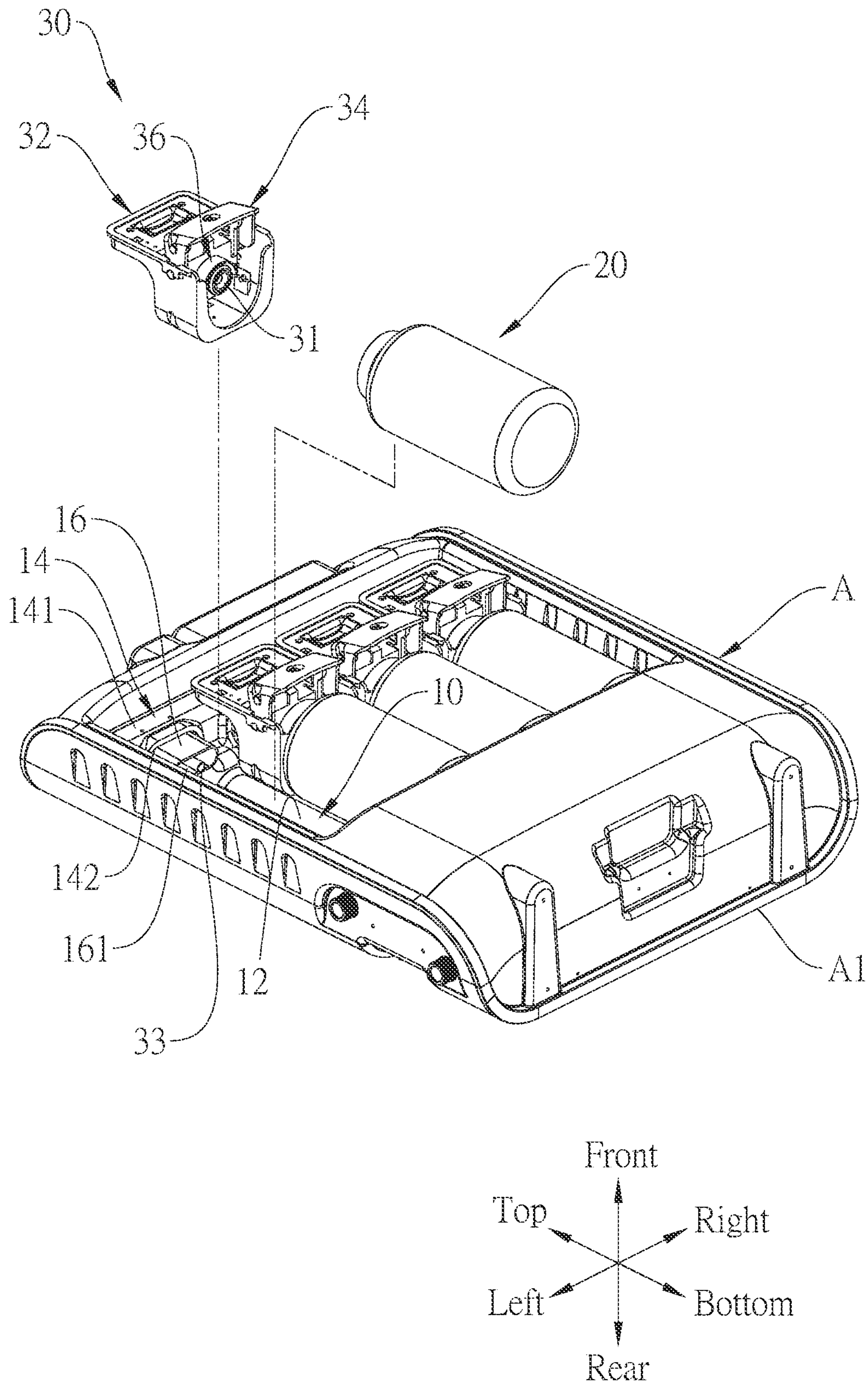
FIG. 2 is a partially exploded view of the liquid container connecting structure according to the embodiment of the present invention.
Figure 3:
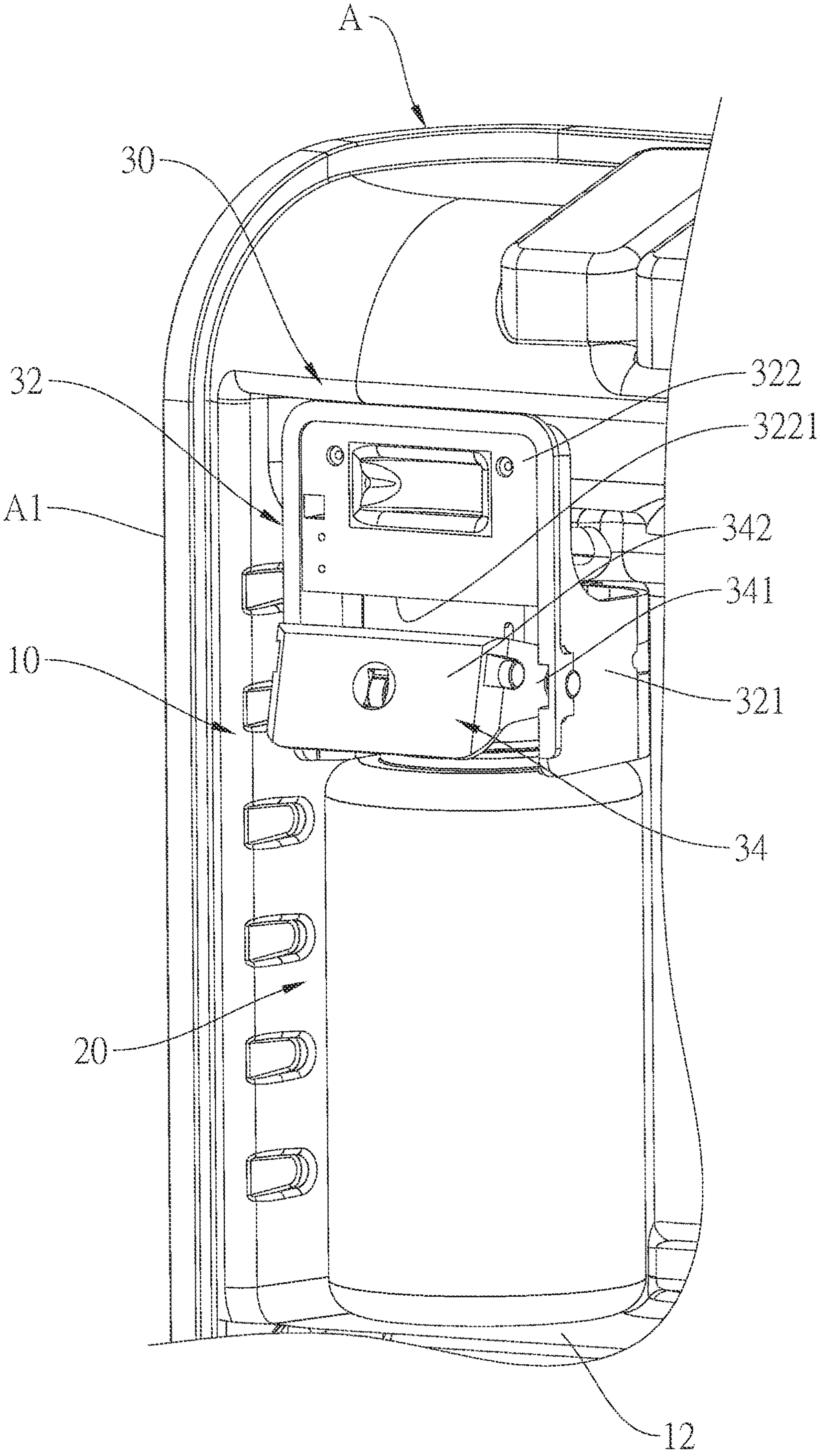
FIG. 3 is a partially enlarged perspective view of FIG. 1 seen from another direction, showing a part of the left side of the liquid container connecting structure.
Figure 4:
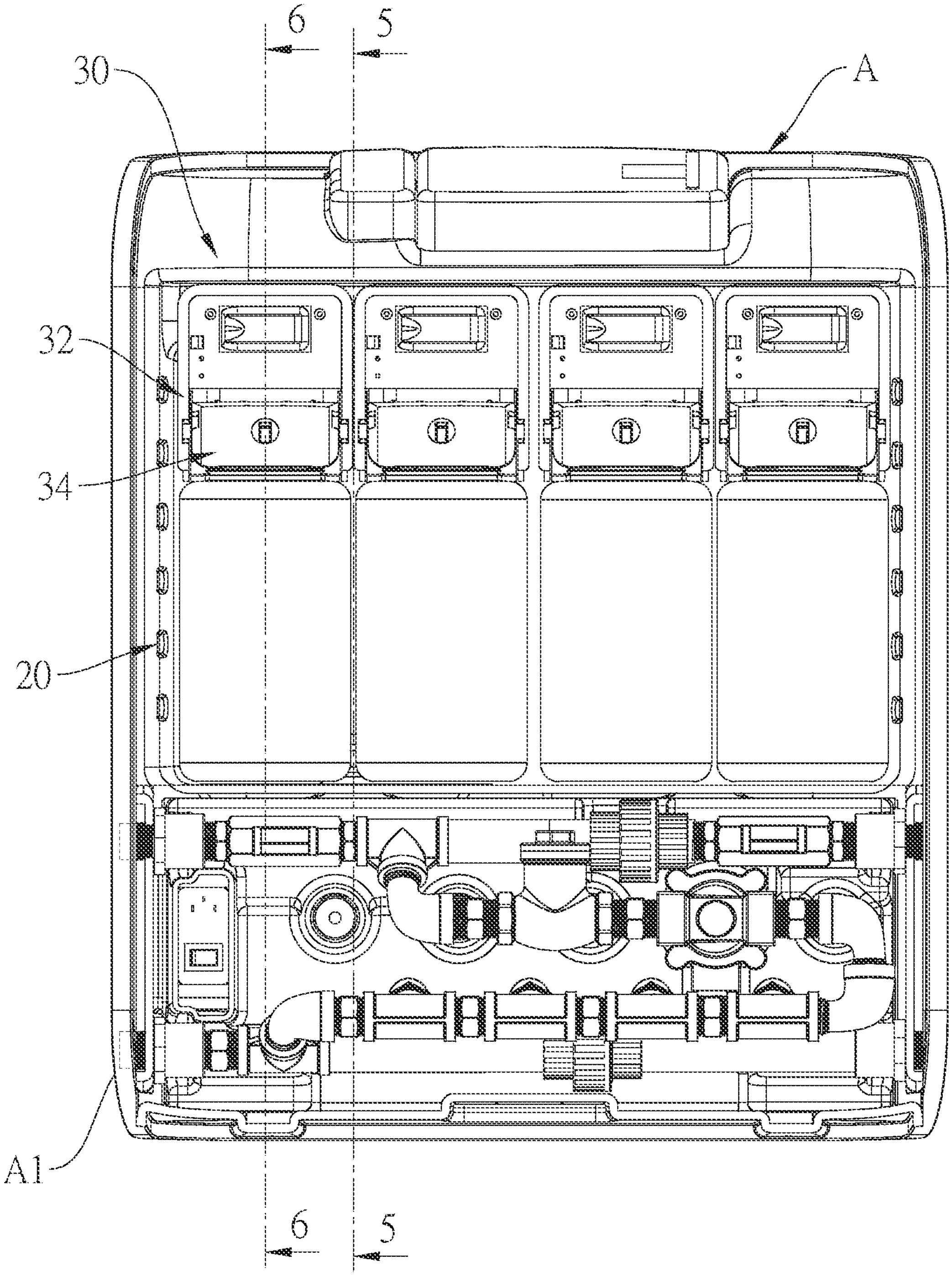
FIG. 4 is a front view of the liquid container connecting structure according to the embodiment of the present invention.
Figure 5:
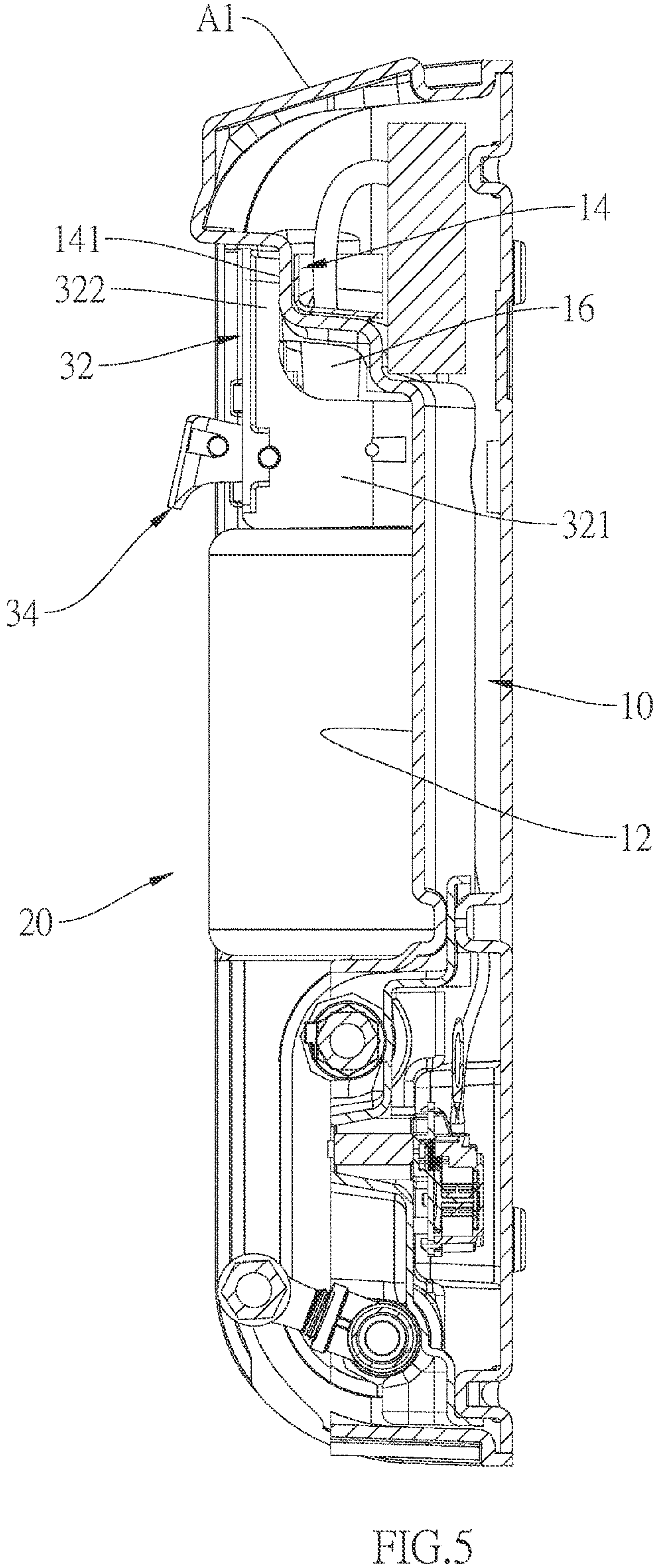
FIG. 5 is a sectional view along the 5-5 line in FIG. 4.

In the description below, the terms "top", "bottom", "front", "rear", "left", "right", "upper", "lower", and their derivatives, should be interpreted from the perspective view of the present invention in FIG. 2. It is also understood that the terminology used herein is for the purpose of describing particular embodiments only, and is not intended to limit the scope of the present invention. A connecting structure 100 for a liquid container according to an embodiment of the present invention is illustrated in FIG. 1 to FIG. 7 and includes a receiving groove 10, a liquid container 20, and a locking structure 30.

The receiving groove 10 could be provided in certain devices. For example, the receiving groove 10 in the current embodiment is provided on, but not limited to, a front surface of a case A1 of a hot spring generator A. The receiving groove 10 has a top end and a bottom end and has a receiving space 12 therein, wherein the receiving space 12 is adapted to receive the liquid container 20.

As shown in FIG. 2, FIG. 3, and FIG. 6 to FIG. 8, the liquid container 20 is disposed in the receiving space 12 of the receiving groove 10. A bottom portion of the liquid container 20 abuts against the bottom end of the receiving groove 10. A top end of the liquid container 20 has a suction tube 243 that is a tube disposed along a top-bottom direction and communicates with an inside of the liquid container 20. The suction tube 243 could be a plastic tube, or an elastic silicon tube, could bend upon experiencing a force and could restore to an original position after releasing the force.

The locking structure 30 includes a connecting base 32, a locking assembly 34, a liftable base 36, two swinging arms 38, and a sleeve 31. The connecting base 32 is engaged with the receiving groove 10 and is located at a top side of the receiving space 12. A left side and a right side of the connecting base 32 respectively have a side plate 321, wherein a front side of each of the two side plates 321 has a front axial hole 3211 penetrating along a left-right direction, and a rear side of each of the two side plates 321 has a rear axial hole 3212 penetrating along the left-right direction. A left side and a right side of the locking assembly 34 respectively have a side arm 341, wherein a rear end of each of the two side arms 341 has a first axial rod 3411. Each of the first axial rods 3411 pivotally penetrates through each of the front axial holes 3211, so that the rear end of each of the two side arms 341 is pivotally connected to the front side of each of the two side plates 321. The two side arms 341 extend along a front-rear direction and extend frontwards out of the connecting base 32, wherein a front side of each of the two side arms 341 has a front pivot hole 3412 penetrating along the left-right direction, and two front ends of the two side arms 341 are connected to a pressing plate 342.

The liftable base 36 is disposed between the two side plates 321 of the connecting base 32 and is located directly above the liquid container 20. The liftable base 36 is restricted in the connecting base 32 to lift or decline along the top-bottom direction or move along the front-rear direction. The liftable base 36 has a bottom frame 361, wherein two extending arms 3612 respectively extend frontwards along the front-rear direction out of a left side and a right side of a front end of the bottom frame 361. A front end of each of the two extending arms 3612 has a front pivot rod 3613, wherein each of the front pivot rods 3613 pivotally penetrates one of the front pivot holes 3412, so that the front end of each of the two extending arms 3612 is pivotally connected to the front side of each of the two side arms 341. A left side and a right side of a rear end of the bottom frame 361 respectively have a rear pivot rod 3614, and a front end of each of the two swinging arms 38 has a rear pivot hole 381, wherein each of the rear pivot rods 3614 of the bottom frame 361 pivotally penetrates one of the rear pivot holes 381, so that the left side and the right side of the rear end of the bottom frame 361 are respectively and pivotally connected to the front end of each of the two swinging arms 38. A rear end of each of the two swinging arms 38 has an inner axial hole 382 that aligns with one of the two rear axial holes 3212, wherein two second axial rods 383 respectively and pivotally penetrate through the two rear axial holes 3212 and the two inner axial holes 382, so that the rear end of each of the two swinging arms 38 is pivotally connected to the rear side of one of the two side plates 321. Therefore, the two side plates 321 of the connecting base 32, the two side arms 341 of the locking assembly 34, the liftable base 36, and the two swinging arms 38 form a four-bar linkage.

The sleeve 31 is engaged with the bottom frame 361, wherein a bottom portion of the sleeve 31 detachably fits around the suction tube 243 of the top end of the liquid container 20. In the current embodiment, when the receiving groove 10 is provided in the case A1 of the hot spring generator A, a top portion of the sleeve 31 is adapted to be connected to and communicate with a connecting tube 33, and the sleeve 31 is connected to a pipeline in the hot spring generator A via the connecting tube 33, so that a liquid, such as a hot spring concentrate, in the liquid container 20 could be supplied to the pipeline in the hot spring generator A. Alternatively, in other embodiments, a liquid source inside the case A1 could supply a liquid to the liquid container 20 via the connecting tube 33 and the sleeve 31.

Figure 6:
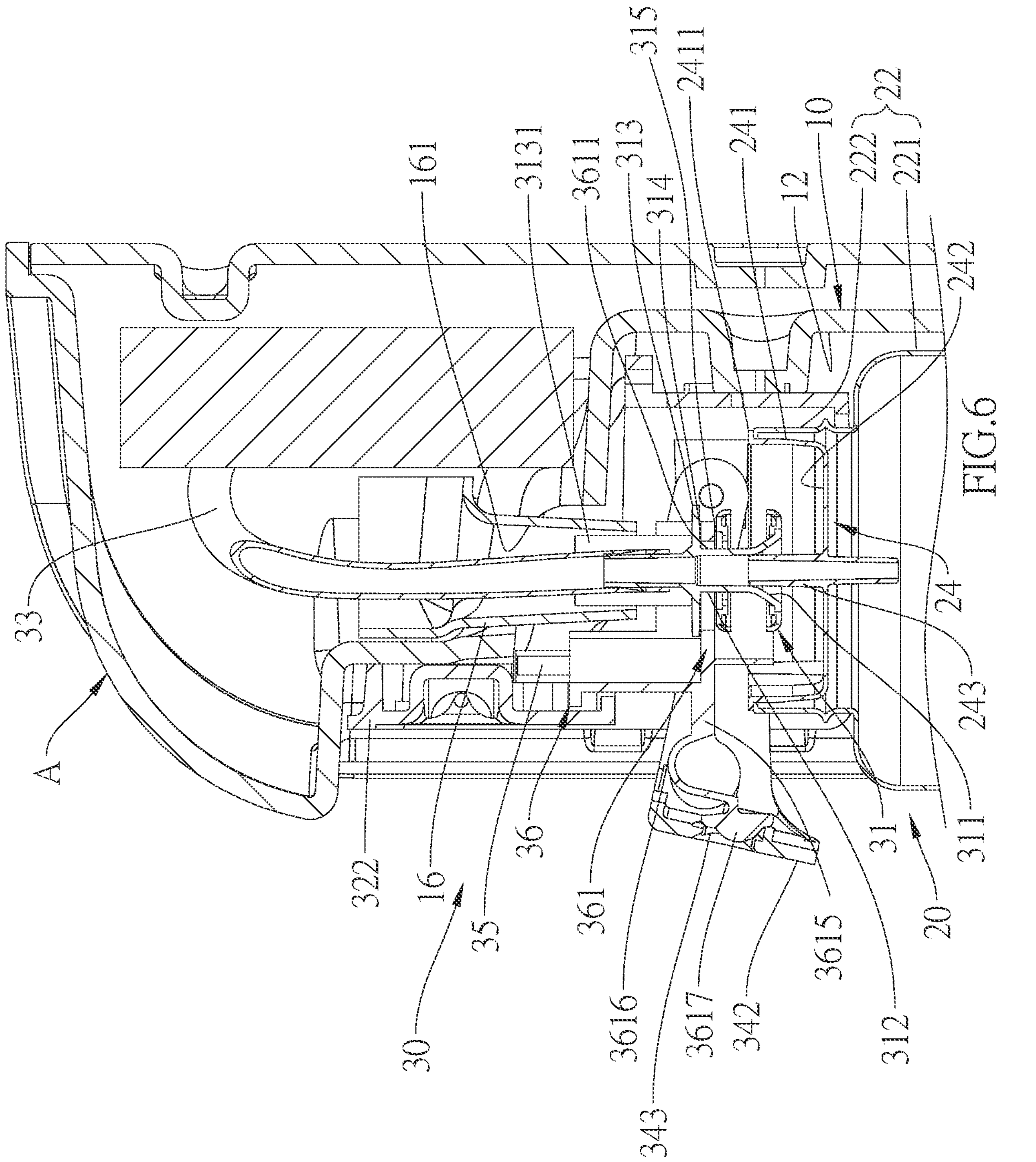
FIG. 6 is a sectional view along the 6-6 line in FIG. 4, showing the top portion of the liquid container connecting structure.
Figure 7:
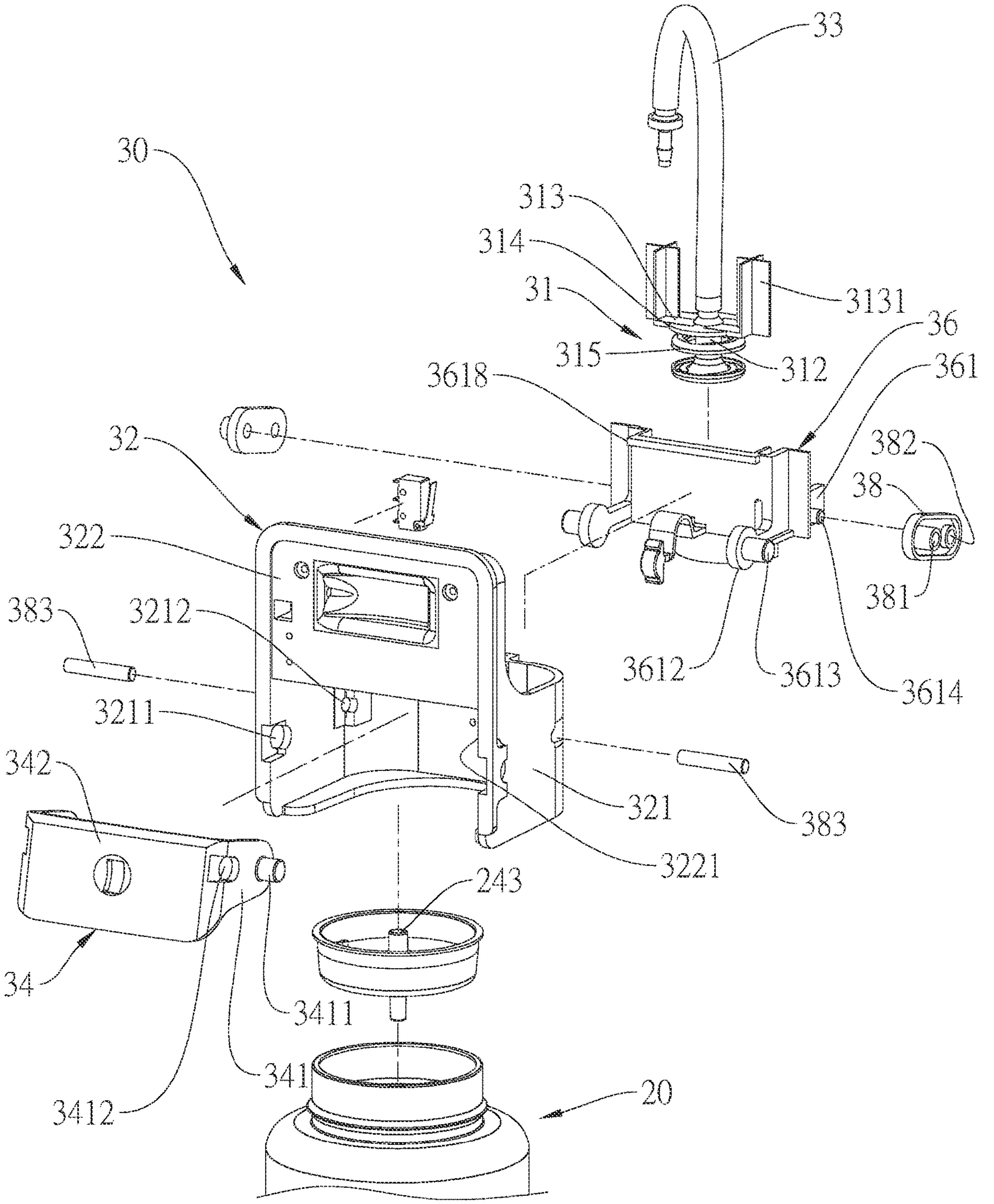
FIG. 7 is an exploded view of the liquid container and the locking structure of the present invention.
Figure 9A:
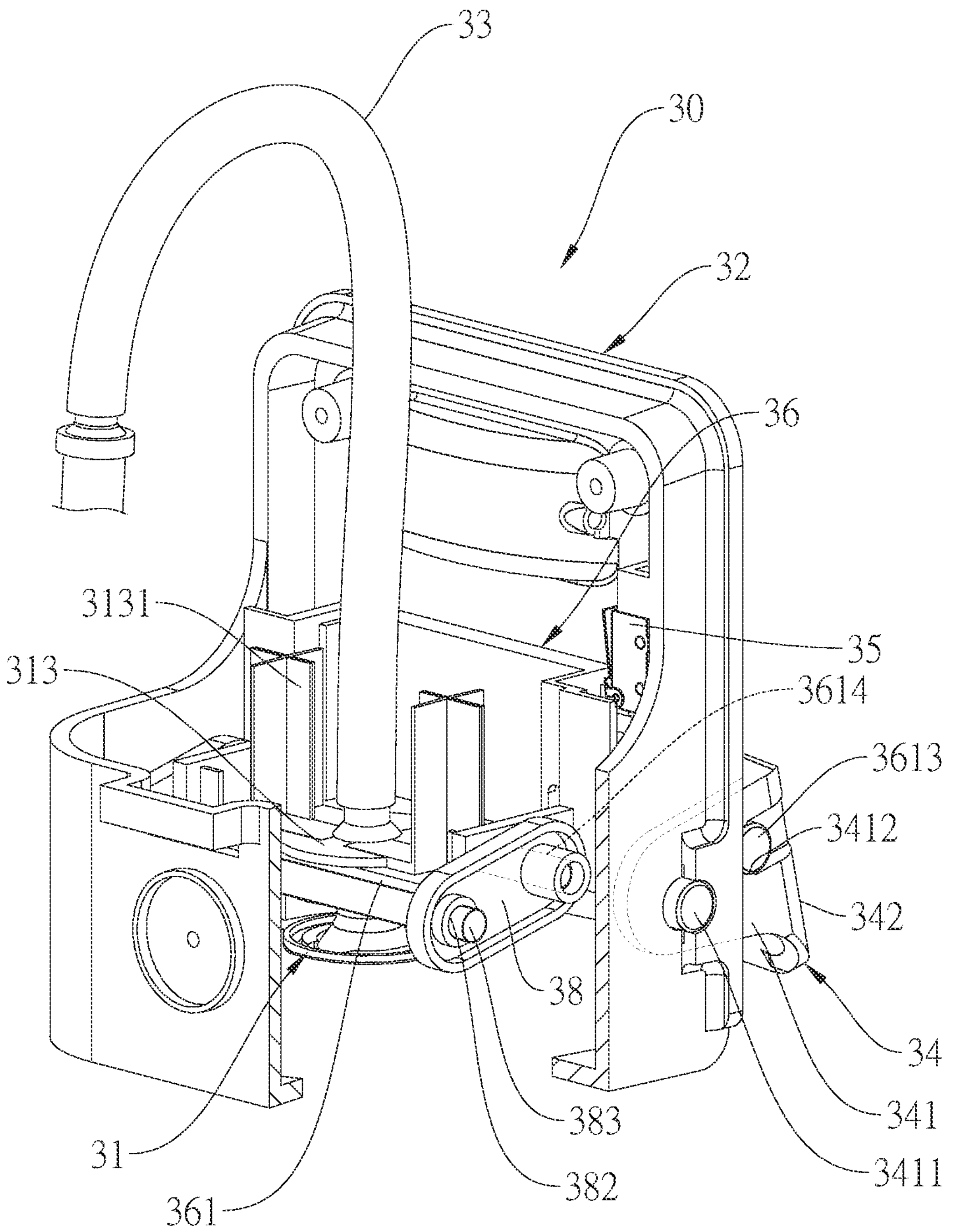
FIG. 9A is a schematic view, showing a section of a part of the locking structure.
Figure 9B:
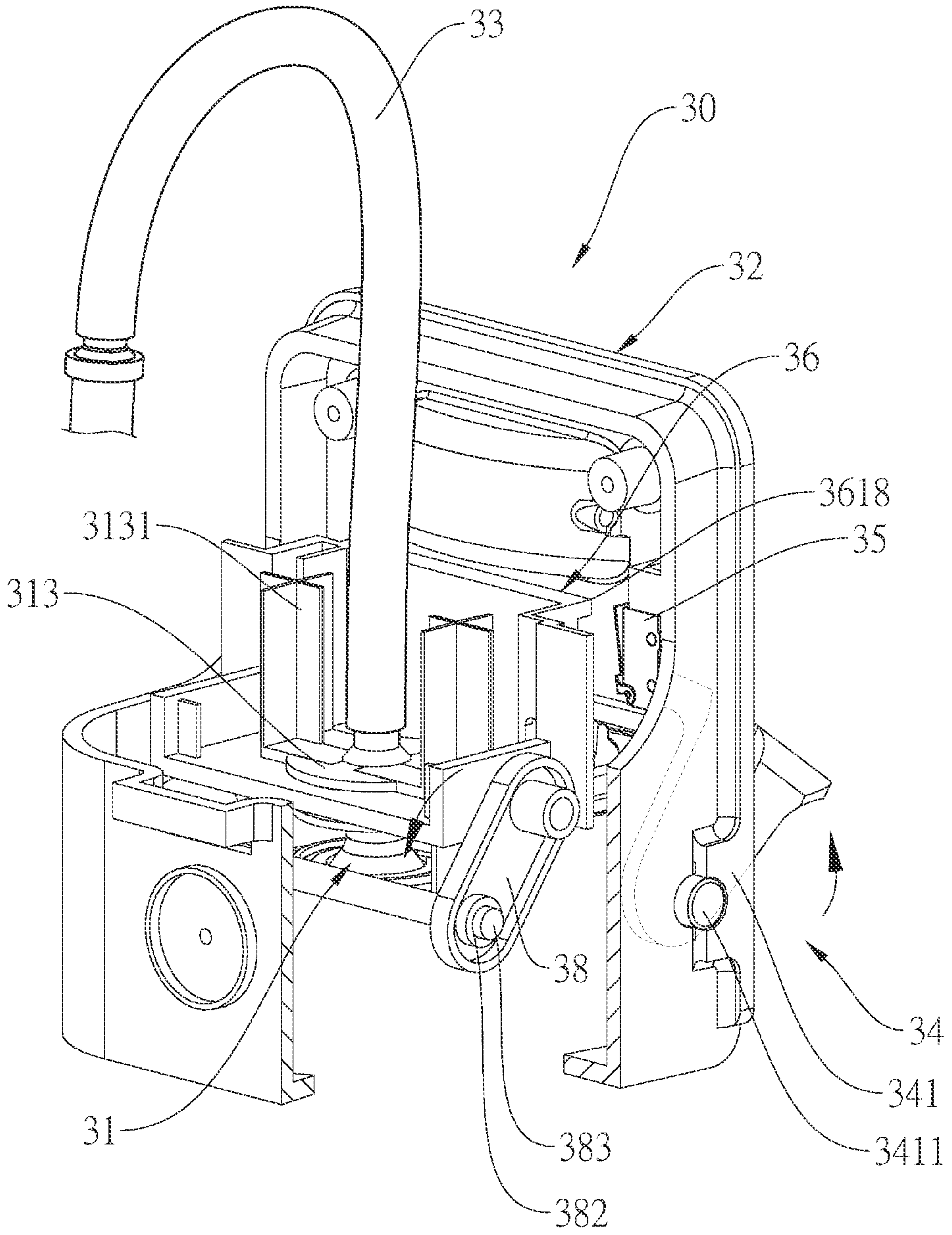
FIG. 9B is a schematic view, showing the liftable base and the sleeve shown in FIG. 9A are lifted.

Referring to FIG. 6, FIG. 9A, and FIG. 9B, when replacing the liquid container 20 in the receiving groove 10 of the liquid container connecting structure 100 of the present invention, a user flips the pressing plate 342 of the locking assembly 34 upwards to make a front side of the locking assembly 34 pivots around the first axial rod 3411, driving the liftable base 36 and the sleeve 31 to lift along the top-bottom direction, so that the sleeve 31 could be detached from the suction tube 243 of the liquid container 20, and the liquid container 20 could be withdrawn from the receiving groove 10. Then a liquid container 20 that is replaced is disposed into the receiving groove 10, and the pressing plate 342 of the locking assembly 34 is pressed to make the locking assembly 34 pivot back to an original position, driving the liftable base 36 and the sleeve 31 to decline along the top-bottom direction, so that the sleeve 31 could fit around a suction tube 243 of the liquid container 20 again, thereby connecting the liquid container 20 and the sleeve 31 rapidly.

As shown in FIG. 2 and FIG. 6 to FIG. 9A, the top end of the receiving groove 10 has an engaging portion 14 therein, wherein a front surface of the engaging portion 14 has a recess 141, and a bottom portion of the engaging portion 14 has an opening 142. A tubing base 16 passes through the opening 142 of the engaging portion 14, and has a tubing hole 161 therein. The liftable base 36 is located directly below the tubing base 16. The connecting tube 33 that is connected to the top portion of the sleeve 31 passes upwards through the tubing hole 161 to enter the case A1 to be connected to the pipeline in the hot spring generator A.

A front side of the connecting base 32 has a panel frame 322, wherein an upper half portion of the panel frame 322 is engaged with and fixed to the recess 141 of the front surface of the engaging portion 14, and a lower half portion of the panel frame 322 extends downwards along the top-bottom direction out of the recess 141. A middle of the lower half portion of the panel frame 322 has an opening 3221. A front-end edge of one of the two side plates 321 is connected to a left side edge of the lower half portion of the panel frame 322, and a front-end edge of the other side plate 321 is connected to a right side edge of the lower half portion of the panel frame 322. The two side arms 341 of the locking assembly 34 respectively penetrate through a left side and a right side of the opening 3221 of the panel frame 322. A middle of the pressing plate 342 has a positioning hole 343. The bottom frame 361 extends frontwards along the front-rear direction to form an elastic arm 3615, wherein a middle of the elastic arm 3615 has an elastic structure 3616 that is curved. A front end of the elastic arm 3615 has a positioning member 3617, wherein the positioning member 3617 is fitted into the positioning hole 343 of the locking assembly 34 for positioning.

A bottom end of the sleeve 31 forms a fitting opening 311 that is bell-shaped, wherein the fitting opening 311 could guide the suction tube 243 to enter the sleeve 31, which facilitates the sleeve 31 to fit around a top portion of the suction tube 243, thereby the sleeve 31 could be movably connected to the bottom frame 361 in a float-like way. More specifically, the sleeve 31 could slightly move in a space between the sleeve 31 and the bottom frame 361 along the front-rear direction, thereby absorbing the deviation between the sleeve 31 and the bottom frame 361. In the current embodiment, a restricting hole 3611 is provided in a middle of the bottom frame 361. The sleeve 31 is a plastic tube that is elastic and deformable, and forms a neck 312 between the fitting opening 311 and the top portion of the sleeve 31. A top edge of the neck 312 of the sleeve 31 forms a first flange 314, and a bottom edge of the neck 312 of the sleeve 31 forms a second flange 315, wherein a diameter of the neck 312 is smaller than a diameter of the first flange 314 and a diameter of the second flange 315. The sleeve 31 is inserted into the restricting hole 3611 from top down, so that the neck 312 of the sleeve 31 passes through the restricting hole 3611 to be fixed on the bottom frame 361 of the liftable base 36. The diameter of the first flange 314 and the diameter of the second flange 315 are larger than a diameter of the restricting hole 3611, and the diameter of the neck 312 of the sleeve 31 is smaller than the diameter of the restricting hole 3611, thereby the sleeve 31 could move in the restricting hole 3611 along the front-rear direction relative to the bottom frame 361. A periphery of the top portion of the sleeve 31 is engaged with a guiding assembly 313. A left side and a right side of the guiding assembly 313 respectively have a guiding rod 3131, wherein the two guiding rods 3131 are both a rod extending upwards along the top-bottom direction, and respectively pass through a left side and a right side of the tubing hole 161 in a slidable way along the top-bottom direction, thereby the guiding assembly 313 could be guided by a tubular wall of the tubing hole 161 to slide along the top-bottom direction.

Figure 8:
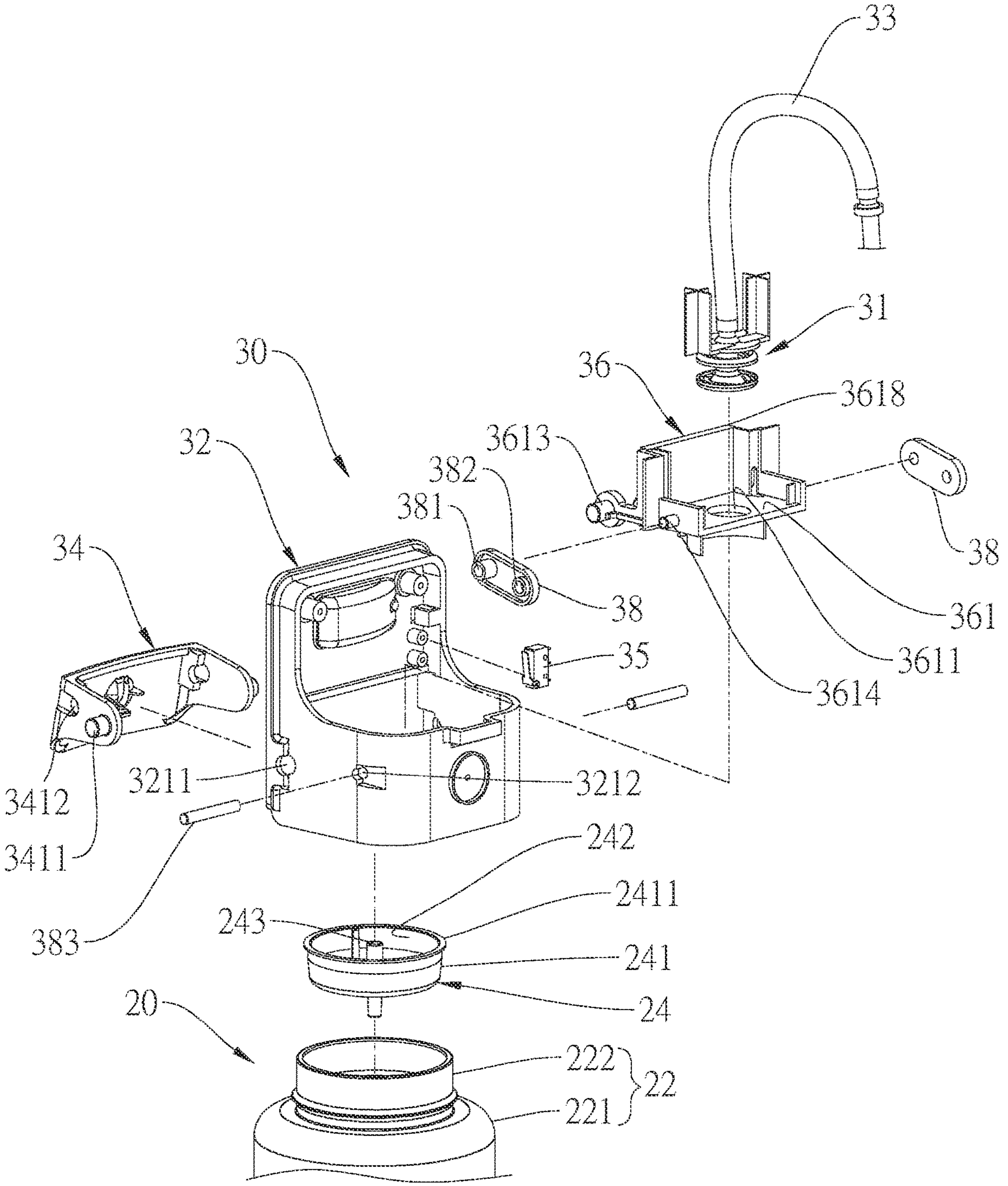
FIG. 8 is an exploded view of the liquid container and the locking structure of the present invention seen from another direction.

With the guiding assembly 313 passing through the tubing hole 161, which allows the sleeve 31 to be guided by the tubular wall of the tubing hole 161 to lift or decline along the top-bottom direction, and with the restricting hole 3611 of the liftable base 36 fitting around a periphery of the neck 312 of the sleeve 31, the liftable base 36 could be restricted to lift or decline along the top-bottom direction and move along the front-rear direction. As shown in FIG. 8 to FIG. 9A, a micro switch 35 is disposed on a rear surface of the panel frame 322, and a front side of the bottom frame 361 forms a protrusion 3618 corresponding to a position of the micro switch 35. When the liftable base 36 lifts or declines, the protrusion 3618 of the bottom frame 361 could trigger the micro switch 35, so that the micro switch 35 that is triggered could detect whether the liftable base 36 is located at a high position or a low position. If the liftable base 36 is located at the low position, the micro switch 35 could recognize that the locking structure 30 is in a status of connecting to the liquid container 20. If the liftable base 36 is located at the high position, the micro switch 35 could recognize that the locking structure 30 is in a status of releasing the liquid container 20.

As shown in FIG. 8, the liquid container 20 includes a bottle 22 and a suction tube assembly 24. The bottle 22 has a body 221 and a neck 222 connected to a top end of the body 221. The suction tube assembly 24 has a cap 241, wherein an inner side of the cap 241 has a recessing groove 242, and a top edge of an outer peripheral surface of the cap 241 has a flange 2411. The cap 241 is fitted in the neck 222 of the bottle 22, and the flange 2411 of the cap 241 abuts against a top edge of the neck 222 of the bottle 22 for positioning. The suction tube 243 is engaged with a middle of a bottom portion of the recessing groove 242, wherein at least a part of the suction tube 243 is located in the recessing groove 242, and a bottom end of the suction tube 243 communicates with the bottle 22, so that the suction tube 243 could be detachably engaged with the bottle 22. In the current embodiment, the suction tube 243 passes through and is engaged with the middle of the bottom portion of the recessing groove 242. An upper half portion of the suction tube 243 is located in the recessing groove 242, and a top end of the upper half portion of the suction tube 243 extends to align with a top end of the 241. A lower half portion of the suction tube 243 extends into the body 221 of the bottle 22. When the sleeve 31 fits around the suction tube 243, a bottom side of the sleeve 31 enters the recessing groove 242. When replacing the liquid container 20 of the connecting structure 100 of the present invention, as the suction tube assembly 24 provided with the suction tube 243 is detachably engaged with the bottle 22, the suction tube assembly 24 could be engaged with different bottles 22 and is reusable, so that only the bottle 22 is needed to replace when replacing the liquid container 20, saving the cost of replacing the suction tube assembly 24.

It must be pointed out that the embodiments described above are only some preferred embodiments of the present invention. All equivalent structures which employ the concepts disclosed in this specification and the appended claims should fall within the scope of the present invention.

What is claimed is:

1. A connecting structure for use with a liquid container, comprising:

a receiving groove;

the liquid container disposed in the receiving groove, wherein a top end of the liquid container has a suction tube; and a locking structure comprising a connecting base, a locking assembly, two swinging arms, and a sleeve, wherein the connecting base is engaged with a top side of the receiving groove; a left side and a right side of the connecting base respectively have a side plate, and a left side and a right side of the locking assembly respectively have a side arm, wherein a rear end of each of the two side arms is pivotally connected to a front side of one of the two side plates; the two side arms extend along a front-rear direction and extend frontwards out of the connecting base, wherein two front ends of the two side arms are connected to a pressing plate; a liftable base is disposed between the two side plates and has a bottom frame; the liftable base moves along a top-bottom direction in the connecting base and moves along the front-rear direction in the connecting base; two extending arms respectively extend frontwards along the front-rear direction out of a left side and a right side of the bottom frame; a front end of each of the two extending arms is pivotally connected to a front side of each of the two side arms; the left side and the right side of the bottom frame are respectively and pivotally connected to the front end of each of the two swinging arms; a rear end of each of the two swinging arms is pivotally connected to a rear side of one of the two side plates; the sleeve is engaged with the bottom frame and fits around the suction tube.

2. The connecting structure for use with the liquid container as claimed in claim 1, wherein the liquid container comprises a bottle and a suction tube assembly; a top portion of the bottle has a neck; the suction tube assembly has a cap; an inner side of the cap has a recessing groove, and a top edge of an outer peripheral surface of the cap has a flange; the cap is fitted in the neck of the bottle, and the flange of the cap abuts against at a top edge of the neck of the bottle for positioning; the suction tube is engaged with a middle of a bottom portion of the recessing groove, wherein at least a part of the suction tube is located in the recessing groove.

3. The connecting structure for use with the liquid container as claimed in claim 1, wherein a top end of the receiving groove has an engaging portion therein, and a tubing hole is disposed on a bottom portion of the engaging portion; a periphery of a top portion of the sleeve is engaged with a guiding assembly; the guiding assembly passes through the tubing hole in a slidable way along the top-bottom direction; the sleeve is movably connected to the bottom frame and is configured to slightly move within a space between the sleeve and the bottom frame along the front-rear direction to absorb the deviation between the sleeve and the bottom frame.

4. The connecting structure for use with the liquid container as claimed in claim 1, wherein a top end of the receiving groove has an engaging portion therein; a bottom portion of the engaging portion has an opening; a tubing base passes through the opening of the engaging portion and has a tubing hole therein; the liftable base is located directly below the tubing base; a connecting tube is connected to a top portion of the sleeve and passes through the tubing hole.

5. The connecting structure for use with the liquid container as claimed in claim 4, wherein a periphery of a top portion of the sleeve is engaged with a guiding assembly; a left side and a right side of the guiding assembly respectively have a guiding rod; the two guiding rods are both a rod extending upwards along the top-bottom direction, and respectively pass through a left side and a right side of the tubing hole in a slidable way along the top-bottom direction.

6. The connecting structure for use with the liquid container as claimed in claim 5, wherein a middle of the bottom frame has a restricting hole; the sleeve is a tube that is elastic and forms a neck; a top edge of the neck of the sleeve forms a first flange, and a bottom edge of the neck of the sleeve forms a second flange; the neck of the sleeve passes through the restricting hole to be fixed on the bottom frame of the liftable base; a diameter of the first flange and a diameter of the second flange are larger than a diameter of the restricting hole; a diameter of the neck is smaller than the diameter of the restricting hole.

7. The connecting structure for use with the liquid container as claimed in claim 4, wherein a front side of the connecting base has a panel frame; an upper half portion of the panel frame is engaged with and fixed to a front surface of the engaging portion, and a middle of a lower half portion of the panel frame has an opening; the two side arms of the locking assembly respectively penetrate through a left side and a right side of the opening of the panel frame; a front-end edge of each of the two side plates is connected to the lower half portion of the panel frame.

8. The connecting structure for use with the liquid container as claimed in claim 7, wherein a micro switch is disposed on a rear surface of the panel frame, and a front side of the bottom frame forms a protrusion corresponding to a position of the micro switch; when the liftable base lifts or declines, the protrusion of the bottom frame triggers the micro switch.

9. The connecting structure for use with the liquid container as claimed in claim 1, wherein a bottom end of the sleeve forms a fitting opening that is bell-shaped.

10. The connecting structure for use with the liquid container as claimed in claim 1, wherein a middle of the pressing plate has a positioning hole; the bottom frame extends frontwards along the front-rear direction to form an elastic arm; a middle of the of the elastic arm has an elastic structure that is curved; a front end of the elastic arm has a positioning member fitting into the positioning hole.

* * * * *